United States Patent Office 3,562,359
Patented Feb. 9, 1971

3,562,359
GRAFT POLYMERIZATION OF VINYL HALIDE ON AN ELASTOMER IN THE PRESENCE OF A MERCAPTAN
Sheldon F. Gelman, Danbury, Conn., assignor to Stauffer Chemical Company, New York, N.Y., a corporation of Delaware
No Drawing. Filed Nov. 7, 1967, Ser. No. 681,099
Int. Cl. C08f 15/02
U.S. Cl. 260—879                                    79 Claims

ABSTRACT OF THE DISCLOSURE

Vinyl halide polymers which exhibit improved processing characteristics without sacrificing physical properties are prepared by polymerizing vinyl halide monomer in the presence of: (1) an aliphatic mercaptan in an amount based on —SH equivalence of from about 0.000075 to about 0.05 equivalence —SH per mole of monomeric material, and (2) from about 0.01 to about 1% by weight of a polymerizable organosolvent soluble unsaturated diene elastomer such as polybutadiene, styrene/butadiene copolymer, or natural rubber. The monomer is preferably 100% vinyl chloride though minor amounts of other ethylenically unsaturated monomers can also be used. The mercaptan is preferably a polymercaptan having at least 3 and more preferably from 3 to 5 mercaptan groups per molecule.

---

The present invention is directed to a process for preparing vinyl halide polymers which exhibit improved processing characteristics without sacrificing physical properties. Particularly, the present invention relates to vinyl halide polymers prepared by polymerizing a monomer composition which is predominantly vinyl halide in the presence of: (1) an aliphatic mercaptan compound preferably having at least 3 mercaptan groups per molecule in an amount based on —SH equivalence of from about 0.000075 to about 0.05 equivalence —SH per mole of monomer in the monomer composition material, and (2) from about 0.05 to about 1.0% by weight based on the total weight of monomer in the monomer composition of a polymerizable, organosolvent soluble, unsaturated diene ealstomer. As used herein, the term "per mole of monomer in the monomer composition" is intended to be based on the additive total of the number of moles or fractions thereof of each monomer in the monomer composition used in preparing the polymer. The term "—SH equivalence" is intended to be based on the number of functional mecaptan groups present in the mercaptan compound. Equivalence is computed by the following formula:

$$\frac{\text{number —SH groups/compound}}{\text{molecular weight of compound}}$$

$\times$ amount of compound used in grams/mole of monomer

= equivalence

Polymers formed by the addition polymerization of vinyl halide monomers, such as vinyl chloride, have gained considerable commercial importance because of the low cost of the prepared polymer in addition to many desirable physical properties, such as hardness, clarity and inertness to chemicals. While polyvinyl chloride has many advantages, the polymer has the disadvantage of lacking stability toward heat and light. Heat causes the degradation of the polymer, apparently by the release of hydrochloric acid to form double bonds on the polymer chain which are then sites for cross-linking. Free radicals are also formed in the dehydrohalogenation reaction and, in the presence of oxygen, peroxide groups are also formed. The total effect is to cause the polymer to blacken in color and cross-link to an infusible and useless material. The thermal stability of the polymer is an important factor in that polyvinyl chloride is a thermoplastic polymer and therefore must be heated to the fluxing point in order to process the polymer into useable products. At the temperatures at which polyvinyl chloride begins to flow or flux so as to allow for processing by calendering, blow molding, or extruding, the polymer begins to degrade. An increase in processing temperature to allow for faster processing increases the degradation rate further. While the slight degree of degradation during processing is tolerated by processors, it is still considered a property which desirably should be eliminated.

It has now been unexpectedly found that vinyl halide polymers can be prepared which exhibit lower fluxing or flowing characteristics so as to allow for easier processing of the polymer without sacrificing physical properties.

In accordance with the present invention, there is provided a process for preparing vinyl halide polymers which exhibit improved processing characteristics without the loss of physical properties, which process comprises polymerzing in the presence of a free radical initiator an ethylenically unsaturated monomer composition containing a predominant amount of vinyl halide monomer of the formula:

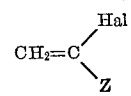

wherein Z is hydrogen or halogen and Hal means halogen, the term halogen as used herein including fluorine, chlorine, bromine and iodine, in the presence of: (1) an aliphatic mercaptan compound, preferably having at least 3 mercaptan groups, in an amount based on —SH equivalents of from 0.000075 to about 0.05 equivalence —SH per mole of monomer in the monomer composition, and (2) from about 0.01 to about 1% by weight based on the total weight of monomer in the monomer composition of a polymerizable, organosolvent soluble, unsaturated diene elastomer. Surprisingly, the polymers formed are thermoplastic polymers of high molecular weight which are characterized by physical properties commensurate with polymers of equal molecular weight formulated by polymerization in the absence of the mercaptan material and the diene elastomer with the additional advantage that the melt flow viscosity under shear of the polymers is decreased so as to provide improved processing characteristics. Also, the polymer exhibits a slower rate of thermal degradation as compared to a polymer of comparable molecular weight. The decrease in melt flow viscosity allows for the procesing of the polymer under thermal conditions which are less conducive to degradation without the sacrifice of physical properties which the polymer is capable of providing.

The exact chemical nature of the polymer which is formed by the process of the present invention is not known. In theory, it is believed that a graft copolymer is formed between the vinyl halide and the diene elastomer. The mercaptan is in some manner chemically attached to the polymer chain through, it is believed, the sulfur atom. If the mercaptan is polyfunctional, it is believed that the chemical structure of the polymer is changed, possibly by the formation of a more highly branched polymer structure. The foregoing is theory and applicant is not intended to be bound thereby.

As used herein, the term elastomer is intended to be a generic term to all polymer substances, whether liquid or solid, having the basic chemical structure and properties of natural, reclaimed, vulcanized or synthetic type rubbers and applicants do not intend to be limited to polymers having elastic characteristics.

The vinyl halide monomers included within the formula given above that can be used in the present invention include, for example, vinyl fluoride, vinyl chloride, vinyl bromide, vinyl iodide, vinylidene fluoride, vinylidene chloride, vinylidene bromide, vinylidene iodide and the like, though vinyl chloride is preferred. The formula is intended to include all α-halo-substituted ethylenically unsaturated materials which are included within the limits of the formula and which are capable of entering into an addition polymerization reaction. The polymers of the present invention can be formed of the same or different monomer materials falling within the formula and, thus, the invention is intended to cover homopolymers, copolymers, terpolymers, and interpolymers formed by the addition polymerization of the materials falling within the formula. Illustrative of these copolymers is a copolymer of vinyl chloride and vinylidene chloride. The term vinyl halide as used in the claims is intended to include both homo and copolymers of compounds falling within the given formula.

While it is preferred that the monomer composition be comprised totally of vinyl halide monomer, the present invention is also intended to include copolymers formed by the free radical addition polymerization of a monomer composition containing a predominant amount, e.g., at least 50% of vinyl halide and a minor amount, e.g., up to 50% by weight of another ethylenically unsaturated monomer material copolymerizable therewith. Preferably, the other ethylenically unsaturated monomer material is used in amounts of less than 25% by weight and more preferably in amounts less than 10% by weight of the total monomer materials used in preparing the polymer. Suitable ethylenically unsaturated monomer materials which can be used are those which can be copolymerized with the vinyl halide monomer and which do not have reactive groups which would interfere with the reactive nature of the mercaptan group and prevent the mercaptan from performing its chemical function in the reaction mixture so as to provide the desired final product. Illustrative of suitable material which can be used to form copolymers, terpolymers, interpolymers and the like are the following: monoolefinic hydrocarbons, i.e., monomers containing only carbon and hydrogen, including such materials as ethylene, propylene, 3-methylbutene-1, 4-methylpentene-1, pentene-1, 3,3-dimethylbutene-1, 4,4-dimethylbutene-1, octene-1, decene-1, styrene and its nuclear or alpha-alkyl or aryl substituted derivatives, e.g., o-, m-, or p-methyl, ethyl, propyl or butyl styrene; alphamethyl, ethyl, propyl or butyl styrene; phenyl styrene; and halogenated styrenes such as alpha-chlorostyrene; monoolefinically unsaturated esters including vinyl esters, e.g., vinyl acetate, vinyl propionate, vinyl butyrate, vinyl stearate, vinyl benzoate, vinyl-p-chlorobenzoates; alkyl methacrylates, e.g., methyl, ethyl, propyl and butyl methacrylate; octyl methacrylate, alkyl crotonates, e.g., octyl; alkyl acrylates, e.g., methyl, ethyl, propyl, butyl, 2-ethyl hexyl, stearyl, hydroxyethyl and tertiary butylamino acrylates; isopropenyl esters, e.g., isopropenyl acetate, isopropenyl propionate, isopropenyl butyrate and isopropenyl isobutyrate; isopropenyl halides, e.g., isopropenyl chloride; vinyl esters of halogenated acids, e.g., vinyl alpha-chloroacetate, vinyl alpha-chloropropionate and vinyl alpha-bromopropionate; allyl and methallyl esters, e.g., allyl chloride, allyl cyanide; allyl chlorocarbonate, allyl nitrate, allyl formate and allyl acetate and the corresponding methallyl compounds; esters of alkenyl alcohols, e.g., beta-ethyl allyl alcohol and beta-propyl allyl alcohol; halo-alkyl acrylates, e.g., methyl alpha-chloroacrylate, ethyl alpha-chloroacrylate, methyl alpha-bromoacrylate, ethyl alpha-bromoacrylate, methyl alpha-fluoracrylate, ethyl alpha-fluoracrylate, methyl alpha-iodoacrylate and ethyl alpha-iodoacrylate; alkyl alpha-cyanoacrylates, e.g., methyl alpha-cyanoacrylate and ethyl alpha-cyanoacrylate; maleates, e.g., monomethyl maleate, monoethyl maleate, dimethyl maleate, diethyl maleate; and fumarates, e.g., monomethyl fumarate, monoethyl fumarate, dimethyl fumarate, diethyl fumarate; and diethyl glutaconate; monoolefinically unsaturated organic nitriles including, for example, fumaronitrile, acrylonitrile, methacrylonitrile, ethacrylonitrile, 1,1-dicyanopropene-1, 3-octenenitrile, crotonitrile and oleonitrile; monoolefinically unsaturated carboxylic acids including, for example, acrylic acid, methacrylic acid, crotonic acid, 3-butenoic acid, cinnamic acid, maleic, fumaric and itaconic acids, maleic anhydride and the like. Amides of these acids, such as acrylamide, are also useful. Vinyl alkyl ethers and vinyl ethers, e.g., vinyl methyl ether, vinyl ethyl ether, vinyl propyl ether, vinyl n-butyl ether, vinyl isobutyl ether, vinyl 2-ethylhexyl ether, vinyl 2-chloroethyl ether, vinyl cetyl ether and the like; and vinyl sulfides, e.g., vinyl β-chloroethyl sulfide, vinyl β-ethoxyethyl sulfide and the like can also be included. Diolefinically unsaturated hydrocarbons containing two olefinic groups in conjugated relation and the halogen derivatives thereof, e.g., butadiene-1,3; 2-methyl-butadiene-1,3; 2,3-dimethyl-butadiene-1,3; 2-chloro-butadiene-1,3; 2,3-dichloro-butadiene-1,3; and 2-bromo-butadiene-1,3 and the like.

Specific monomer compositions for forming copolymers can be illustrated by vinyl chloride and/or vinylidene chloride and vinyl acetate, vinyl chloride and/or vinylidene chloride and maleic or fumaric acid esters, vinyl chloride and/or vinylidene chloride and acrylate or methacrylate ester, vinyl chloride and/or vinylidene chloride and vinyl alkyl ether. These are given as illustrative of the numerous combinations of monomers possible for the formation of copolymers. The present invention is intended to cover all such combinations which fall within the scope of the present invention. While these combinations are intended to be included within the scope of the present invention, it is preferred that the polymer be formed from pure vinyl halide monomer and most preferably pure vinyl chloride.

The free radical polymerization of the monomer composition is conducted in the presence of an aliphatic mercaptan, preferably having at least three and more preferably from 3 to 5 mercaptan groups per molecule, which is present in an amount based on —SH equivalence of from about 0.000075 to about 0.05 equivalence —SH per mole of monomer in the monomer composition. The aliphatic mercaptan can be a monomercaptan or a polymercaptan and the term aliphatic mercaptan is intended to include any mercaptan wherein the mercaptan group is attached to the remainder of the molecule by means of an aliphatic carbon atoms, e.g., a non-aromatic carbon atom. This can be represented by the formula:

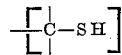

wherein the free bonds of the carbon atom can be attached to aliphatic, aromatic or inorganic moieties and $n$ is an integer of 1 and above. Thus, the mercaptan compound includes aliphatic as well as aralkyl types. The mercaptan compound can have a straight chain or branched chain molecular configuration. The polymercaptan compounds can be symmetrical or unsymmetrical with regard to the —SH functionality. The mercaptan group can be attached to a primary, secondary or tertiary carbon atom. Other functional groups, for example, ester groups, ether groups, amide groups, hydroxy groups, and the like, may also be present provided that they do not interfere with the reactive nature of the mercaptan group and prevent the mercaptan group from performing its chemical function in the reaction mixture so as to provide the desired final product. The polymercaptan compound can be a monomeric compound or a low molecular weight polymer having at least 3 pendant mercaptan groups per molecule. The molecular weight of the polymeric polymercaptan is desirably less than 3000 for ease of use in the polymerization.

Illustrative of the various mercaptan containing moieties which moieties can comprise all or part of the mercaptan containinng moieties which form the aliphatic mercaptan compound for use in the present invention are:

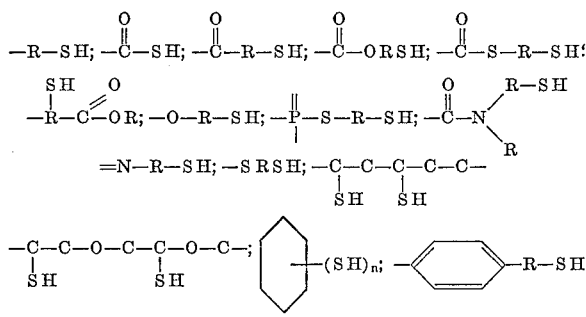

and the like wherein R is aliphatic and preferably an alkylene radical. These are given only as illustrative of the various mercaptan containing moieties which can be present either alone or in combination in the mercaptan compound. Other moieties not specifically mentioned which are within the generic description of the mercaptan compound are intended to be included within the scope of the present invention.

Any desired mercaptan compound may be used alone or in admixture with other mono- or polymercaptan compounds with equal facility. Therefore, it is intended that the term "mercaptan compound" as used herein include not only pure mercaptan compounds but also admixtures of various mono- and/or polymercaptan compounds.

The amount of mercaptan compound used in the process of the present invention is based on the functional equivalency of the mercaptan groups per mole of monomer used in forming the final polymer. Polymers can be prepared in accordance with the present invention by utilizing quantities of a mercaptan compound sufficient to provide an —SH equivalence of from about 0.000075 to about 0.05 equivalence —SH per mole of monomer used to form the final polymer. Equivalency is computed in accordance with the following formula:

$$\frac{\text{number —SH group/compound}}{\text{molecular weight of compound}}$$

$\times$ amount of compound used in grams/mole of monomer $=$ equivalence

The above formula can be used to directly compute the —SH equivalence of a single mercaptan compound. The equivalence of admixtures of different mercaptan compounds are obtained by determining the equivalence for each mercaptan compound using the above formula followed by adding the equivalence from each to obtain the total —SH equivalence of —SH groups present during the polymerization. Preferably, the —SH equivalence is maintained within the range of about 0.000075 to about 0.005, and more preferably within the range of about 0.00015 to about 0.002 —SH equivalence per mole of monomer.

Suitable monomercaptans can be illustrated by methyl mercaptan, ethyl mercaptan, propyl mercaptan, n-butyl mercaptan, n- and t-butyl mercaptan, n- and t-pentyl mercaptan, hexyl mercaptan, n- and t-heptyl mercaptan, n- and t-octyl mercaptan, n- and t-decyl mercaptan, n- and t-dodecyl mercaptan, n- and t-tetradecyl mercaptan, n- and t-hexadecyl mercaptan, n- and t-octadecyl mercaptan, n- and t-eicosyl mercaptan, n- and t-pentacosyl mercaptan, n- and t-octacosyl mercaptan, n- and t-tricontyl mercaptan and blends thereof.

Other monomercaptans can be illustrated by thioacetic acid, 1-mercapto, 2 - butanone, methyl mercaptoacetate, ethyl mercaptothioacetate, 1-mercapto-2 ethoxyethane, diethyl mercaptoethyl phosphorotrithioate, 2-mercaptoethyl acetamide, dimethyl aminomethyl mercaptan, cysteamine, mercaptomethylthiopropane, monomercapto-cyclohexane, benzyl mercaptan, cysteine, and mercaptoethanol.

Suitable dimercaptans can be illustrated by ethanedithiol, 2,3 dimercaptopropanol, decanedithiol-1,10 and the like.

Suitable polymercaptan materials having more than 3 mercaptan groups per molecule can be illustrated by pentaerythritol tri(7-mercaptoheptanoate), pentaerythritol tetra(7-mercaptoheptanoate), mercaptoacetic acid triglyceride, pentaerythritol tri(beta-mercaptopropionate), pentaerythritol tetra (beta-mercaptopropionate), cellulose tri(alpha-mercaptoacetate), 1,2,3-propane-trithiol, 1,2,3,4-neopentane-tetrathiol, 1,2,3,4,5,6 - mercaptopoly(ethyleneoxy)ethyl(sorbitol), 1,1,1-trimethyl propane tri(alpha-mercaptoacetate), dipentaerythritol hexa(3 - mercaptopropionate, 1,2,3 - tris(alpha - mercaptoacetyl) propane, thiopentaerythritol tetra(alpha - mercaptoacetate), 1,6,10-trimercaptocyclododecane, 1,2,3,4,5,6 - hexamercaptocyclohexane, N,N',N'',N'''-tetra(2 - mercaptoethyl)pyromellitamide, tri - (2 - mercaptoethyl)nitrilotriacetate, pentaerythritol tri(alpha - mercaptoacetate), pentaerythritol tetra(alpha - mercaptoacetate), trip(p - mercaptomethylphenyl)methane, 2,2,7,7 - tetrakis(mercaptomethyl) - 4,5 dimercaptooctane, 5,5,5 - tri(mercaptoethyl)phosphorotrithioate, xylitol penta(beta - mercaptopropionate), and the like.

Illustrative of low molecular weight polymeric materials having at least 3 pendant mercaptan groups per molecule are homopolymers and copolymers of vinyl thiol, e.g., polyvinyl thiol. Other polymeric thiols, such as glycerol/ethylene glycol polyether polymercaptan can also be used.

It is preferred to use low molecular weight monomeric materials having from 3–5 mercaptan groups per molecule as illustrated by pentaerythritol tetrathioglycolate, pentaerythritol tetra(3 - mercaptopropionate), trimethylolethane tri(3-mercaptopropionate), xylitol penta-(beta-mercaptopropionate), trimethylolethane trithioglycolate, trimethylolypropane tri (3 - mercaptopropionate) and trimethylolpropane trithioglycolate.

The foregoing materials are given as illustrative of polymercaptan compounds having 3 to 5 mercaptan groups per molecule. It is intended that the above compounds are illustrative of and not limited to the various compounds within the preferred group of polymercaptans having from 3 to 5 mercaptan groups per molecule.

The diene elastomer is a polymerizable, organosolvent soluble unsaturated diene elastomeric homopolymer or copolymer. Polymerizable as used herein is intended to indicate the presence of at least 3 carbon to carbon double bond linkages per molecule. These linkages can be in the main molecular chain and in side or pendant chains. The diene elastomer must also be organosolvent soluble which is intended to mean solubility in an organic solvent which is compatible with the polymerization reaction or solubility in the monomer used to form the polymer. The molecular weight of the elastomer can vary anywhere from about 200 to about 100,000, the minimum molecular weight for any polymer system being that which will provide the 3 carbon to carbon double bond linkages per molecule. Preferably, elastomers having an apparent molecular weight as measured by solution viscosity of below about 20,000, and more preferably below about 5,000 are used. The diene elastomer can be liquid or solid as desired. Most preferably, the diene elastomer is a low molecular weight liquid material having a molecular weight of between about 1,000 and about 2,000.

The diene elastomers include both natural and synthetically prepared elastomers having available unsaturation. Preferably, the elastomers are formed from open-chain conjugated dienes having from 4 to 8 carbon atoms. Specific examples of elastomeric materials useful in this invention are natural elastomers such as rubber, which is essentially a polymer of isoprene, chlorinated rubber, masticated or oxidized rubber, reclaimed rubber, balata and gutta percha. Synthetic elastomers include polybutadiene - 1,3, polyisoprene, poly - 2,3-dimethylbutadiene-1,3, polychloroprene, and the like; the "synthetic natural" rubbers such as cis - 1,4 head-to-tail polyisoprene and other polymers obtained from 1,3-dienes by means of directive polymerization; polypentadiene-1,3, polycyclopentadiene, polyhexadiene - 2,4, polyheptadiene-2,4, and the like. A preferred homopolymeric material is the butadiene type elastomer, e.g., from a diene having 4 carbon atoms in the main molecular chain and derivatives thereof.

Diene copolymers, terpolymers, interpolymers and other multicomponent diene polymers can also be employed. The term "polymerizable, organosolvent soluble diene elastomer" is intended to include not only the homopolymers but also copolymers, terpolymers and interpolymers of dienes with other copolymerizable materials. Copolymeric diene elastomers generally contain at least 50% by weight of the diene and preferably from about 55% to about 85% by weight diene. Preferably, the diene copolymers are butadiene copolymers, e.,g., from a diene having 4 carbon atoms in the main molecular chain and derivatives thereof. Diene copolymers can be illustrated by GRS rubber, e.g., styrene/butadiene copolymer of a wide variety of proportions though generally of a 25/75 weight percent ratio styrene/butadiene; nitrile rubber, e.g., copolymers of a diene such as butadiene with acrylonitrile illustrated by a 67/33 weight percent ratio butadiene - 1,3/acrylonitrile copolymer and butadiene/styrene/acrylonitrile illustrated by a 35/35/30 weight percent ratio butadiene/styrene/acrylonitrile terpolymer; copolymers of isobutylene with monomers such as isoprene and butadiene and illustrated by a 97/3 weight percent ratio isobutylene/isoprene copolymer. Other ethylenically unsaturated monomers which can be utilized to form copolymers are illustrated by vinyl aromatics such as isobutylene, styrene, methyl styrene, chlorostyrene, 2,3-dichlorostyrene, vinyl naphthalene, vinyl pyridine, ring-substituted styrenes such as o-, m-, or p-methyl or ethyl styrene and also other polymerizable vinyl carbocyclic and vinyl heterocyclic aromatics; vinyl chloride, vinyl acetate, vinyl propionate, vinylidene chloride, acrylic or methacrylic acids and their lower alkyl esters such as the methyl, ethyl, or butyl esters, ethylenically unsaturated diacids and their anhydrides such as fumaric and maleic and their esters, acrylonitrile, vinyl ethers such as methyl vinyl ether and divinyl ether, monoolefins such as ethylene and propylene, as well as the monomeric forms of the homopolymers listed above such as butadiene, cyclopentadiene, 1,3 pentadiene, isoprene and chloroprene. Preferably, a styrene/butadiene copolymer having a 25/75 weight percent ratio and a molecular weight of between about 1,000 and about 2,000 is used.

The butadiene elastomer can be used in an amount of from about 0.01% to about 1% by weight based on the total weight of monomer in the monomer composition. Preferably from about 0.05% to about 0.5% and more preferably from about 0.1% to about 0.4% of the elastomer is used.

Hereinafter, the present invention will be described using the preferred butadiene elastomer as the diene elastomer for purposes of explanation. It is to be understood that the use of the term butadiene elastomer is for descriptive purposes and that the present invention is not limited thereto. It is intended that the term butadiene elastomer be construed broadly to include the polymerizable, organosolvent soluble unsaturated diene elastomers as described above.

The free-radical polymerization can, in accordance with the method of the present invention, be accomplished using mass, suspension, emulsion or solution techniques, though the use of the suspension technique is preferred. The various additives and conditions as used in such polymerization procedures are also usable in the operation of the method of the present invention. Variation of conditions of reaction depending on the type of monomer composition, catalyst or initiator system and type of procedure are within the purview of a skilled artisan.

Mass or bulk polymerization is initially a single phase reaction comprising the monomer and a monomer soluble catalyst or initiator. Preferably, and in the practice of the method of the present invention, a polymercaptan, such as 1,2,3-propanetrithiol and a butadiene elastomer such as styrene/butadiene which are soluble in the monomer phase are used. Since mass polymerizations are highly exothermic, the reaction mixture should be vigorously agitated during the polymerization reaction to assist in heat dissipation so as to prevent the polymerization reaction from "running away." Mass polymerization generally is conducted in the absence of any additives other than a free-radical initiator and hence is advantageous for the preparation of polymers having a minimum degree of contamination.

Suspension polymerization refers to the polymerization of monomer dispersed in a suspension medium which is a nonsolvent for both the monomer and the polymer, generally water, utilizing, normally, a monomer soluble initiator. Suspension polymerization is similar to mass polymerization in that polymerization takes place within a monomer phase containing a monomer soluble initiator. However, the use of the suspension medium assists in the dissipation of the heat of reaction and therefore the polymerization reaction is easier to control. Suspension polymerization is generally accomplished by dispersing the monomer in the suspending medium either by constant agitation, by the use of a suspending agent and preferably both. Various suspending agents such as gelatin, hydroxymethyl cellulose, hydroxyethyl cellulose, hydroxypropyl cellulose, carboxymethyl cellulose, talc, clay, polyvinyl alcohol and the like can be used in the suspension polymerization of vinyl halide and these agents can be used in the method of the present invention. Other suspending agents which are known to be useful in the suspension polymerization of vinyl halides can also be used. The type and amount of the suspending agent used has, as is known, some influence on the particle size of the finally obtained product. The exact amounts of suspending agent and type can be selected by the skilled artisan so as to provide the particle size of product desired. Various other additives, such as thermal stabilizers, and the like, which are normally utilized in the polymerization can also be included. Suspension polymerization techniques are generally preferred in that the polymerization is easier to conduct and the product obtained has a particle size which is more easily handled and used by polymer processors.

Emulsion polymerization refers to the polymerization of a monomer dispersed in an aqueous medium utilizing a water soluble catalyst or initiator and an emulsifying agent to maintain the monomer in its emulsified form. Emulsion polymerization differs from suspension polymerization in that the initiator in the emulsion polymerization is generally within the aqueous phase whereas the initiator in the suspension polymerization is generally within the monomer phase. In theory, the kinetics of the two types of polymerization seem to proceed along entirely different lines. Another distinction is that the emulsion polymerization provides polymer particles within the range of $0.1\mu$ to $5\mu$ whereas the suspension polymerization provides much larger particles of product within the range of $10\mu$ to $1000\mu$. Various emulsifying agents such as sodium lauryl sulfate, potassium stearate, alkyl benzene sulfonate, ammonium dialkyl sulfosuccinate are known for use in polymerizing vinyl halides by emulsion techniques and can be used in the practice of the present invention. Other emulsifying agents which are also known to be useful in emulsion polymerization of vinyl halides can also be used. The exact amounts of the emulsifying agent and a type which is used are easily determined by the skilled artisan. In general, any of the additives such as catalysts and stabilizers, which are normally used in emulsion polymerization of vinyl halides can be utilized in the practice of the present invention. The product obtained from the emulsion polymerization which is in the form of a latex can be utilized per se or the latex can be coagulated to precipitate the polymer particles which can then be dried and processed into any desired form by polymer processor.

Solution polymerization is a process which requires the use of an inert liquid which is a solvent for the monomeric compounds used in forming the polymer which solvent may or may not be a solvent for the prepared polymer. The catalyst or initiators, if used, are of the same types as those used in the mass polymerization reaction. Solution polymerization has the advantage that the solvent, as in suspension polymerization, assists in the dissipation of the heat of reaction. The average molecular weight of polymers prepared by the use of solution polymerization techniques are generally lower than those obtained by the use of other polymerization techniques and this method can be effective in the production of low molecular weight vinyl halide polymers. In general, any of the additives such as catalysts and stabilizers which are normally used in solution polymerization of vinyl halides can be utilized in the practice of the present invention. The polymer is usually separated from the solvent and the solvent is recycled so as to make the process more economical. The solvents which are used in solution polymerization can be those in which only the monomer is soluble and those in which both the monomer and resulting polymer are soluble, the former solvents being preferred. Illustrative of the monomer soluble, polymer insoluble solvents which can be used in the performance of a solution polymerization of vinyl halides are: pentane, hexane, benzene, toluene and cyclohexane. Illustrative of monomer-polymer solvents which can be used in the solution polymerization of vinyl halides are: cyclohexanone, tetrahydrofuran, dimethyl sulfoxide, and dimethyl formamide. A mixture of solvents can also be used to reduce cost, e.g., as by the use of an expensive solvent diluted with an inexpensive nonsolvent or weak solvent. Illustrative of solvent mixtures are: tetrahydrofuran and toluene or petroleum ether. The foregoing solvents and mixtures are given as illustrative and are in no way intended to be inclusive of all the possible solvents and mixtures thereof which can be utilized.

The polymerization of the vinyl halide monomers is a free-radical polymerization reaction and should be conducted in the presence of a free-radical initiator. Useful free-radical initiators are organic or inorganic peroxides, persulfates, ozonides, hydroperoxides, peracids and percarbonates, azo compounds, diazonium salts, diazotates, peroxysulfonates, trialkyl borane-oxygen systems, and amine oxides. Azodiisobutyronitrile is particularly useful in the present invention. The catalyst is used in concentrations ranging from about 0.01 to about 1.0% by weight based on the total weight of the monomers. For use in mass, suspension, and solution polymerization, the catalysts which are soluble in the organic phase, such as benzoyl peroxide, diacetyl peroxide, azobisisobutyronitrile or diisopropyl peroxydicarbonate, azobis (α-methyl-γ-carboxybutyronitrile), caprylyl peroxide, lauroyl peroxide, azobisisobutyramidine hydrochloride, t-butyl peroxypivalate, 2,4-dichlorobenzoyl peroxide, azobis (α-γ-dimethylvaleronitrile) are generally used. For use in emulsion polymerization, water soluble catalysts such as ammonium persulfate, hydrogen peroxide are used. Preferably, the initiator which is used is chosen from a group of initiators known in the prior art as the "hot catalysts" or those which have a high degree of free-radical initiating activity. Initiators with a lower degree of activity are less desirable in that they require longer polymerization times. Also, long polymerization times may cause preliminary product degradation evidenced by color problems, e.g., pinking. Other known free-radical initiating catalysts, such as light illumination or irradiation with gamma-ray can also be used. Catalysts which tend to cause ionic or coordination polymerization such as the Ziegler-type catalylsts can be used in the present invention if organic solvents are used as the reaction medium.

The polymerization of the monomers is conducted at temperatures varying between −80° C. to about 120° C. for varying periods of time depending on the type of monomers utilized and the polymerization technique employed. The choice of a specific reaction temperature is dependent to a large extent on the initiator which is utilized and the rate of polymerization which is desired. Generally, for suspension polymerizations, temperatures of about 40° C. to 70° C. in the presence of an azo type initiator have been found to be effective.

It has been found that the relative viscosity of the polymer is dependent to some degree on the concentrations of the mercaptan compound and the butadiene elastomer, and the time and temperature of polymerization. The relative viscosity of the polymer can be increased by increasing the amount of butadiene elastomer used and decreased by increasing the amount of mercaptan. Increases as to time and temperature affect the polymerization rate and thus effect slight increases in the relative viscosity of the produced polymer. Thus, by varying time, temperature and concentrations, polymers of varying relative viscosities can be obtained and this provides greater latitude in the choice of polymerization conditions. Variation is well within the purview of a skilled artisan following his choice of monomer, initiator and polymerization system.

In any of the foregoing polymerization procedures, any other additives which are now commonly utilized can be included within the polymerization mixture. Other procedures such as short-stopping the polymerization at a desired point can also be utilized in accordance with the present invention.

The polymerization products of the present invention can be admixed with various conventional inert additives such as fillers, dyes, and pigments. Also the polymerization products can be admixed with impact modifiers, plasticizers, lubricants, additional thermal stabilizers, and ultra-violet light stabilizers as desired.

The invention is further illustrated in the examples which follow:

EXAMPLES

Suspension polymerization procedure

The following suspension polymerization procedure is used unless otherwise indicated: The reaction mixture or charge is sealed in a one quart soda bottle, and the bottle is immersed in a temperature controlled water bath. The bottles are rotated end over end at 41 revolutions per minute in the bath to provide agitation. Conversion is usually about 95% to about 100%. The charge consists of the following materials in amounts given in approximate parts by weight:

| Charge: | Parts by weight (dry) |
|---|---|
| Vinyl chloride | 100 |
| Deionized water | 233 |
| Suspending agent [1] | 0.167 |
| Initiator [2] | 0.2 |
| Butadiene elastomer [3] | See Table I |
| Polymercaptan [4] | See Table I |

[1] Hydroxymethyl cellulose.
[2] Azobisisobutyronitrile.
[3] Flosbrene ® 25 VLV (−100 mesh)—a viscous, vinyl chloride soluble low molecular styrene/butadiene copolymer containing 25% by weight styrene and having a viscosity average molecular weight of about 1750 supplied by American Synthetic Rubber Corp., Louisville, Ky.
[4] Parts by weight of a commercially available blend of polymercaptans containing:
    35% pentaerythritol tetra(3-mercaptopropionate)
    35% pentaerythritol tri(3-mercaptopropionate)
    10% pentaerythritol di(3-mercaptopropionate)
    10% pentaerythritol mono(3-mercaptopropionate)

TABLE I

| Example | Butadiene elastomer, parts | Polymer-captan, parts | Reaction Temperature, °C | Time, hours | Relative viscosity |
|---|---|---|---|---|---|
| 1 [a] | 0.1 | 0.25 | 55 | 16 | |
| 2 [a] | 0.1 | 0.2 | 55 | 16 | |
| 3 [a] | 0.125 | 0.15 | 55 | 16 | |
| 4 [a] | 0.125 | 0.1 | 55 | 16 | |
| 5 [a] | 0.15 | 0.075 | 55 | 16 | |
| 6 | 0.1 | 0.1 | 58 | 16 | 1.98 |
| 7 | 0.1 | 0.2 | 58 | 16 | 1.90 |
| 8 | 0.2 | 0.1 | 58 | 16 | 2.11 |
| 9 | 0.2 | 0.1 | 60 | 9½ | 2.17 |
| 10 [b] | 0.2 | 0.1 | 60 | 10 | 1.95 |
| 11 [c] | 0.2 | 0.1 | 60 | 8½ | 2.05 |
| 12 | 0.2 | 0.1 | 64 | 16 | |
| 13 | 0.2 | 0.05 | 64 | 16 | |

[a] 1% polyvinyl alcohol suspending agent.
[b] 0.4 parts initiator.
[c] 0.094 parts of t-butylperoxypivalate used as initiator.

NOTE.—Relative viscosity is measured at 30° C. using 1 gram of polymer dissolved in 100 grams of cylcohexanone in a Ubbelohde viscosimeter.

The polymerization procedure set forth above operates equally as well to provide the desired final product when other suspending agents, e.g., gelatin, polyvinyl alcohol, hydroxypropyl cellulose, carboxymethyl cellulose, hydroxyethyl cellulose, talc and clay, are used in place of the hydroxymethyl cellulose. Similarly, the azobisisobutyronitrile initiator can be replaced by lauroyl peroxide, diisopropylperoxy dicarbonate, or t-butyl peroxypivalate initiators.

The approximation of actual processing conditions and the determination of the processability of a polymer can be done in a laboratory by means of a fusion torque rheometer. The polymer in powdered form is placed in the instrument and is fused under the influence of heat and shear. The instrument, which is basically a dynamometer, measures the torque force required to maintain mixer rotors revolving at a constant speed while the polymer is being fused. The instrument comprises a heated rotor cavity of measured size having rotors of the Banbury mixer type mounted therein. The rotors are driven by an electric motor suspended between two bearing blocks through which extends the main shaft of the motor. A weighted balance bar is attached to the motor to compensate for the torque force required in operating the rotors. Attached to the balance bar is a weight measuring device which can be read visually and which is provided with a scribe for recording measured weights on a sheet of recording paper. A tachometer and control circuit is used to maintain the number of revolutions of the rotors constant. A circulatory oil temperature control system is used to control the temperature within the rotor cavity. The test comprises inserting a measured amount of polymer in powdered form into the rotor cavity and measuring the resistance torque on the rotors developed by the sample as it begins to melt. This resistance causes the electric motor to swing in a direction opposite the direction of shaft rotation. This swinging motion is transmitted by the balance bar to the weight measuring device which determines the number of meter-grams of reverse force necessary to offset the swinging motion and hence the torque being applied to the rotors. The torque generally rises from a low point when the sample of polymer is in powdered form to a high point at flux after which the torque subsides to an intermediate equilibrium point or equilibrium torque. The torque remains constant until the polymer degrades whereupon the torque increases due to polymer crosslinking. The equilibrium torque value determines the amount of work in meter-grams which must be applied to the polymer to process the same. The length of time the polymer remains at the equilibrium torque point before degrading is a measure of the thermal stability of the polymer. Another value indicative of stability is the rate of degradation as measured in meter-grams per minute. The faster the degradation, the less stable is the polymer. As used herein, polymers which degrade at a rate of from 0–25 meter-grams per minute are denoted as having failed non-catastrophically, 25 to 100 meter-grams per minute as semi-catastrophically and 100 meter-grams per minute and above as catastrophically. In the following Table II are reported values for fusion torque rheometer measurements made on the polymers of Examples 1–9, 12, and 13 compared with the rheometer values of 5 conventional polyvinyl chloride homopolymers, e.g., two low molecular weight homopolymers, two medium molecular weight homopolymers and one high molecular weight homopolymer. The tests are conducted using a 60 cm.$^3$ sample bowl using Banbury type rotors adjusted to operate at 60 revolutions per minute at a temperature of 180° C. The test samples comprise 100 parts by weight of polymer, 3 parts by weight of a stabilizer (Thermolite 31 which is a sulfur-containing organotin compound manufactured by Metal & Thermit Corporation, Rahway, N.J.) and 0.5 part by weight of a lubricant (calcium stearate). Values reported for fusion torque rheology are in meter-grams and are for equilibrium torque. The values for stability are the number of minutes that the polymer remains at the equilibrium point before degrading. The type of failure results corresponds to the rate ranges given hereinbefore.

TABLE II

| | Butadiene elastomer, parts | Polymer-captan, parts | Relative viscosity | Equilibrium, melt viscosity in meter-grams | Stability at Equilibrium, melt in minutes | Type of failure |
|---|---|---|---|---|---|---|
| Example: | | | | | | |
| 1 | 0.1 | 0.25 | | 1,530 | 45 | Noncatastrophic. |
| 2 | 1.1 | 0.2 | | 1,620 | 35 | Semicatastrophic. |
| 3 | 0.125 | 0.15 | | 1,860 | 43 | Do. |
| 4 | 0.125 | 0.1 | | 1,980 | 41 | Catastrophic. |
| 5 | 0.15 | 0.075 | | 2,130 | 36 | Semicatastrophic. |
| 6 | 0.1 | 0.1 | 1.98 | 1,440 | 25 | Noncatastrophic. |
| 7 | 0.1 | 0.2 | 1.90 | 1,560 | 37 | Do. |
| 8 | 0.2 | 0.1 | 2.11 | 1,740 | 27 | Do. |
| 9 | 0.2 | 0.1 | 2.17 | 1,800 | 33 | Semicatastrophic. |
| 10 | 0.2 | 0.1 | 1.95 | | | |
| 11 | 0.2 | 0.1 | 2.05 | | | |
| 12 | 0.2 | 0.1 | | 1,530 | 47 | Noncatastrophic. |
| 13 | 0.2 | 0.05 | | 1,620 | 44 | Semicatastrophic. |
| Conventional homopolymer: | | | | | | |
| Low mol. wt. | 0 | 0 | 1.70 | 1,260 | 33 | Do. |
| Low mol. wt. | 0 | 0 | 1.78 | 1,500 | 43 | Do. |
| Med. mol. wt. | 0 | 0 | 2.02 | 1,825 | 25 | Catastrophic. |
| Med. mol. wt. | 0 | 0 | 2.12 | 2,190 | 26 | Do. |
| High mol. wt. | 0 | 0 | 2.25 | 2,400 | 25 | Do. |

As can be seen from a comparison of the data in Table II, the torque rheology values for the polymers of the present invention are lower than conventional polyvinyl chloride homopolymers having approxiimately the same relative viscosity. These rheology values indicate that the polymers of the present invention require less work to process than comparable polyvinyl chloride homopolymers, e.g., more easily processable. Also, and since the equilibrium torque point is related to both temperature and shear, the polymers of the present invention can be processed at shear rates comparable to conventional polyvinyl chloride homopolymers of the same approximate relative viscosity but at a lower temperature. Either case provides an area of economic saving for the polymer processor.

Also, the table shows the polymers of the present invention retain their thermal stability as compared to conventional polyvinyl chloride homopolymers.

The physical properties of final products prepared from the polymers of the invention were tested to determine whether or not the easier processing was gained at the sacrifice of physical properties. As can be seen from the following table, tensile strengths are not only maintained but also improved over comparable polyvinyl chloride homopolymers. The table also shows that Izod impact is comparable to conventional homopolymer.

TABLE III

| Polymer | Relative viscosity | Equilibrium, melt in viscosity meter-grams | Tensile strength (p.s.i.) (0.05/ test rate) test ASTM D-638-61T | Izod impact (ft.-lb./inch of notch) unmodified composition test ASTM D-256-56 |
|---|---|---|---|---|
| Med. mol. wt. homopolymer | 2.02 | 1,825 | [1] 7,870±202 | 0.5 |
| Do | 2.12 | 2,190 | 7,940±84 | 0.7 |
| Product of Example 9 | 2.17 | 1,800 | 8,560±250 | 0.5 |

[1] Statistical confidence limits of test.

NOTE.—ASTM=American Society for Testing Materials.

EXAMPLE 14

Using the aforedescribed suspension polymerization procedure, a polymer is prepared wherein the initiator is azobisisobutyronitrile, the suspending agent is hydroxymethyl cellulose and wherein 0.218 parts (0.00103 —SH equivalence per mole of monomer) of trimethylolpropane tri(3-mercaptopropionate) is used as the polymercaptan, and 0.5 part of 1,2 polybutadiene homopolymer having a molecular weight of below 2,000 and containing approximately 80% pendant vinyl groups is used as the butadiene elastomer.

EXAMPLE 15

Using the suspension polymerization procedure at 60° C., a polymer is prepared wherein the initiator is t-butyl peroxypivalate, the suspending agent is gelatin and wherein 0.2 part (0.00103 —SH equivalence per mole of monomer) of pure tetramercaptopentaerythritol is used as the polymercaptan, and 0.75 part of poly B-D R-45M (hydroxy-terminated liquid polybutadiene having a molecular weight of below 2,000 and an iodine number of 398) supplied by Sinclair Petrochemicals, Inc. is used as the butadiene elastomer.

EXAMPLE 16

Using the suspension polymerization procedure at 60° C., a polymer is prepared wherein the initiator is diisopropylperoxydicarbonate, the suspending agent is polyvinyl alcohol and wherein 0.06 part (0.00063 —SH equivalence per mole of monomer) of 1,3,5-trimercaptocyclohexane is used as the polymercaptan, and 0.05 part of a butadiene/acrylonitrile copolymer having a molecular weight below 5,000 is used as the butadiene elastomer.

EXAMPLE 17

Using the aforedescribed suspension polymerization procure at 58° C., a polymer is prepared wherein the initiator is azobisisobutyronitrile, the suspending agent is hydroxymethyl cellulose and wherein 0.214 part (0.0016 —SH equivalence per mole of monomer) of dipentaerythritol hexa(3-mercaptopropionate) is used as the polymercaptan, and 1.0 part of an isobutylene/butadiene copolymer having a molecular weight of below 2,000 is used as the butadiene elastomer.

EXAMPLE 18

A polymer is prepared using the aforedescribed suspension polymerization procedure at 58° C. wherein the initiator is azobisisobutyronitrile, suspending agent is hydroxymethyl cellulose and wherein 1.5 parts (0.001 —SH equivalence per mole of monomer) of polyvinyl thiol having a molecular weight of about 480 and having an average of 8 mercaptan groups per molecule is used as the polymercaptan, and 0.2 part of a styrene/butadiene/acrylonitrile polymer having a molecular weight of below 2,000 is used as the butadiene elastomer.

EXAMPLE 19

A polymer is prepared by repeating Example 12 using a reaction vessel having an inlet valve. The charge with the exception of the polymercaptan is placed in the vessel and polymerization is initiated. The polymercaptan is incrementally added through the inlet valve to the reaction vessel during the first hour of reaction.

Polymers are also prepared using the aforedescribed suspension polymerization procedure and using the following materials:

Example:
20—0.196 part (0.0010 —SH equivalence per mole of monomer) of N,N′,N″,N‴-tetra(2-mercaptoethyl)pyromellitamide.
21—0.117 part (0.0008 —SH equivalence per mole of monomer) of tri(2-mercaptoethyl)nitriloacetate.
22—155 parts of vinylidene chloride (1.6 moles) in place of the 100 parts vinyl chloride used in Example 1.
23—90 parts vinyl chloride and 15.5 parts vinylidene chloride (mole ratio 9/1) in place of the 100 parts vinyl chloride used in Example 1.
24—90 parts vinyl chloride and 13.75 parts vinyl acetate (mole ratio 9/1) in place of the 100 parts vinyl chloride used in Example 1.
25—80 parts vinyl chloride, 15.5 parts vinylidene chloride and 27.5 parts diethyl fumarate (mole ratio 8/1/1) used in place of the 100 parts vinyl chloride used in Example 1.
26—0.189 part (0.001 —SH equivalence per mole of monomer) of xylitol penta(beta-mercaptopropionate).
27—0.043 part (0.0003 —SH equivalence per mole of monomer) of t-butyl mercaptan in place of the polymercaptan used in Example 1.
28—0.097 part (0.0003 —SH equivalence per mole of monomer) of dodecy mercaptan in place of the polymercaptan used in Example 1.
29—0.056 part (0.00045 —SH equivalence per mole of monomer) of 2 mercapto ethanol in place of the polymercaptan used in Example 1.
30—0.054 part (0.0003 —SH equivalence per mole of monomer) 1,2 ethane dithiol in place of the polymercaptan used in Example 1.
31—0.148 part (0.00045 —SH equivalence per mole of monomer) of 1,10 decane dithiol in place of the polymercaptan used in Example 1.

Emulsion polymerization procedure

The reaction mixture or charge containing the monomer initiator emulsifying agent, polymercaptan butadiene elastomer and water is sealed in a one quart soda bottle, the bottle is immersed in a constant temperature bath and the mixture is allowed to react for 14 hours. The bottle is rotated end over end at 41 revolutions per minute to provide the agitation necessary to effect emulsification.

The charge consists of the following materials in amounts given in approximate parts by weight:

| Charge: | Parts by weight (dry) |
|---|---|
| Vinyl chloride | 100 |
| Deionized water | 230 |
| Sodium lauryl sulfate | 2.0 |
| Potassium persulfate | 0.1 |
| Sodium bicarbonate | 0.05 |
| Polymercaptan | --- |
| Butadiene elastomer | --- |

EXAMPLE 32

Using the emulsion polymerization procedure at 58° C., a stable latex is obtained at 100% monomer conversion using as polymercaptan 0.1 part of the polymercaptan blend and 0.2 part of the butadiene elastomer which are used and described in Example 1. The latex is coagulated by drying to obtain the polymer. Replacement of the potassium persulfate/sodium bicarbonate initiator system with copper sulfate/hydrogen peroxide or potassium persulfate/potassium metabisulfite/Fe$^{++}$ initiator systems provides equal results. Other emulsifying agents such as sodium ethylhexyl sulfate and sodium di-n-hexylsulfosuccinate can be used in place of the sodium lauryl sulfate with equal facility.

Solution polymerization procedure

The reaction mixture or charge is sealed in a one quart soda bottle, the bottle is immersed in a constant temperature bath and the mixture is allowed to react for 14 hours. The bottle is rotated end over end at 41 revolutions per minute to provide agitation. The charge consists of the following materials in amounts given in approximate parts by weight:

| Charge: | Parts by weight (dry) |
|---|---|
| Vinyl chloride | 100 |
| Hexane | 200 |
| Azobisisobutyronitrile | 0.1 |
| Polymercaptan | --- |
| Butadiene elastomer | --- |

EXAMPLE 33

Using the solution polymerization procedure at 58° C., a polymer is prepared using as polymercaptan 0.2 part of the polymercaptan blend and 0.2 part of the butadiene elastomer used and described in Example 1. Polymer particles precipitate from the vinyl chloride/hexane solution as formed. Polymer particles are separated from the reaction mixture by filtration and dried to a fine white powder. Equal results can be obtained using other organo-soluble initiators such as lauroyl peroxide, diisopropylperoxydicarbonate and t-butyl peroxypivalate in place of the azobisisobutyronitrile initiator. Also, other solvent systems, such as: pentane, benzene, toluene, cyclohexanone, cyclohexane, tetrahydrofuran, dimethyl sulfoxide, dimethyl formamide and mixtures thereof can be used.

Mass or bulk polymerization procedure

The reaction mixture or charge is sealed in a one quart soda bottle, the bottle is immersed in a constant temperature bath and the polymerization reaction is allowed to proceed for approximately 2½ hours (approximately 20 to 35% monomer conversion). The reaction is stopped by chilling the bottle in cold water and then Dry Ice followed by venting any remaining monomer. Agitation during polymerization is provided by rotating the bottle end over end at 41 revolutions per minute. The charge consists of the following materials in amounts given in approximate parts by weight:

| | Parts by weight (dry) |
|---|---|
| Vinyl chloride | 100 |
| Azobisisobutyronitrile | 0.1 |
| Polymercaptan | --- |
| Butadiene elastomer | --- |

EXAMPLE 34

Using the bulk polymerization procedure at 50° C., a polymer is prepared using 0.2 part of the blend of polymercaptans and 0.1 part of the butadiene elastomer as used and described in Example 1. A fluffy white powder is obtained. Substitution of the azobisisobutyronitrile initiator with other organo-soluble initiators such as lauroyl peroxide, di-isopropylperoxydicarbonate or t-butyl peroxypivalate provides similar results.

Using the aforedescribed emulsion, solution or bulk polymerization procedures, polymers are obtained using:

Example:
35—0.109 part (0.00053 —SH equivalence per mole of monomer) of trimethylolpropane tri(3-mercaptopropionate).

36—0.2 part (0.00103 —SH equivalence per mole of monomer) of tetramercaptopentaerythritol.

37—0.06 part (0.00063 —SH equivalence per mole of monomer) of 1,3,5-trimercaptocyclohexane.

38—0.214 part (0.0016 —SH equivalence per mole of monomer) of dipentaerythritol hexa(3-mercaptopropionate).

39—1.5 parts (0.001 —SH equivalence per mole of monomer) of polyvinyl thiol having a molecular weight of about 480 and an average of about 8 mercaptan groups per molecule.

40—0.196 part (0.0010 —SH equivalence per mole of monomer) of N,N',N'',N'''-tetra(2-mercaptoethyl)pyromellitamide.

41—0.117 part (0.0008 —SH equivalence per mole of monomer) of tri(2-mercaptoethyl)nitrolacetate.

42—155 parts of vinylidene chloride (1.6 moles) in place of the 100 parts vinyl chloride using the polymercaptan and the mutadiene elastomer described in Example 1.

43—90 parts vinyl chloride and 15.5 parts vinylidene chloride (mole ratio 9/1) in place of the 100 parts vinyl chloride using the polymercaptan and the butadiene elastomer described in Example 1.

44—80 parts vinyl chloride, 15.5 parts vinylidene chloride and 27.5 parts diethyl fumarate (mole ratio 8/1/1) in place of the 100 parts vinyl chloride using the polymercaptan and the butadiene elastomer described in Example 1.

45—90 parts vinyl chloride and 13.75 parts vinyl acetate (mole ratio 9/1) in place of the 100 parts vinyl chloride using the polymercaptan and the butadiene elastomer described in Example 1.

46—0.189 part (0.001 —SH equivalence per mole of monomer) of xylitol penta(beta-mercaptopropionate).

47—80 parts vinyl chloride and 41.5 parts monomethyl maleate (8/2 mole ratio) in place of the 100 parts vinyl chloride using the polymercaptan and the butadiene elastomer described in Example 1.

48—90 parts vinyl chloride and 16 parts ethyl acrylate (9/1 mole ratio) in place of the 100 parts vinyl chloride using the polymercaptan and the butadiene elastomer described in Example 1.

49—90 parts vinyl chloride and 8.5 parts acrylonitrile (9/1 mole ratio) in place of the 100 parts vinyl chloride using the polymercaptan and the butadiene elastomer described in Example 1.

50—90 parts vinyl chloride and 11.5 parts vinyl ethyl ether (9/1 mole ratio) using the polymercaptan and the butadiene elastomers described in Example 1.

51—0.043 part (0.0003 —SH equivalence per mole monomer) of t-butyl mercaptan in place of the polymercaptan described in Example 1.

52—0.097 part (0.0003 —SH equivalence per mole of monomer) of t-butyl mercaptan in place of the polymercaptan described in Example 1.

53—0.056 part (0.00045 —SH equivalence per mole of monomer) of 2 mercapto ethanol in place of the polymercaptan described in Example 1.

54—0.45 part (0.0003 —SH equivalence per mole of monomer) of 1,2 ethane dithiol in place of the polymercaptan described in Example 1.

55—0.148 part (0.00045 —SH equivalence per mole of monomer) of 1,10 decane dithiol in place of the polymercaptan described in Example 1.

The foregoing examples have illustrated the method of the present invention using vinyl chloride and vinylidene chloride as the vinyl halide monomer. Other vinyl halide monomers such as vinyl bromide, vinyl iodide, vinylidene bromide, vinylidene iodide and mixtures thereof can be substituted for the vinyl chloride with equal facility. Vinyl fluoride and vinylidene fluoride which have very low vapor pressures can also be used in high pressure polymerization vessels.

The foregoing examples have illustrated the method of the present invention using polybutadiene homopolymer, styrene/butadiene copolymers and various other butadiene copolymer elastomers. Other butadiene elastomers such as polyisoprene, natural rubber, polychloroprene, and copolymers thereof can also be used with equal facility to prepare polymers in accordance with the method of the invention.

Various copolymers and terpolymers using non-vinyl halide type monomers in combination with the vinyl halide monomer has also been illustrated. Any other non-vinyl halide monomer such as those listed heretofore can be substituted with equal facility to prepare copolymers and terpolymers.

The polymers prepared in accordance with the present invention can be used in applications such as the preparation of calendered film, blow molded bottles, extruded flat bed and blown film, extruded articles, tubing, in injection molding, fluidized bed coating, electrostatic powder spraying, rotational casting, as additives to other polymers to increase toughness of the resulting blend or wherever polyvinyl chloride is presently used. It is understood that the polymers of the invention can be compounded with additives usually employed in the coating, impregnating and molding composition arts.

Thus, and in accordance with the present invention, there is provided a method for the preparation of a new class of vinyl halide polymers which exhibit improved processing characteristics, without sacrificing physical properties.

What is claimed is:

1. A method of preparing vinyl halide polymers exhibiting improved processing characteristics without sacrificing physical properties comprising polymerizing in the presence of a free-radical initiator an ethylenically unsaturated monomer composition containing at least 50%, by weight, of a vinyl halide of the formula:

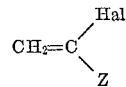

wherein Z is hydrogen or halogen and Hal means halogen, in the presence of: (1) an aliphatic mercaptan compound in an amount based on —SH equivalence of from 0.000075 to about 0.05 equivalence —SH per mole of monomer in said monomer composition, and (2) from about 0.01% to about 1% by weight based on the total weight of monomer in said monomer composition of a polymerizable organo-solvent soluble, unsaturated, conjugated diene elastomer.

2. A method as recited in claim 1 wherein said mercaptan compound is a polymercaptan having at least 3 mercaptan groups per molecule.

3. A method as recited in claim 2 wherein said polymercaptan compound has from 3 to 5 mercaptan groups per molecule.

4. A method as recited in claim 2 wherein said polymercaptan is pentaerythritol tetra-(3 mercaptopropionate).

5. A method as recited in claim 2 wherein said polymercaptan is pentaerythritol tri(3 mercaptopropionate).

6. A method as recited in claim 2 wherein said polymercaptan is a mixture of tetra(3 mercaptoproprionate) and tri(3 mercaptoproprionate).

7. A method as recited in claim 2 wherein said polymercaptan is pentaerythritol tetrathioglycolate.

8. A method as recited in claim 2 wherein said polymercaptan is trimethylolethane tri(3 mercaptopropionate).

9. A method as recited in claim 2 wherein said polymercaptan is trimethylolethane trithioglycolate.

10. A method as recited in claim 2 wherein said polymercaptan is trimethylolpropane tri(3 mercaptopropionate).

11. A method as recited in claim 2 wherein said polymercaptan is trimethylolpropane trithioglycolate.

12. A method as recited in claim 1 wherein said mercaptan compound is used in an amount of from about 0.000075 to about 0.005 equivalence —SH per mole of monomer in said monomer composition.

13. A method as recited in claim 1 wherein said mercaptan compound is used in an amount of from about 0.00015 to about 0.002 equivalence —SH per mole of monomer in said monomer composition.

14. A method as recited in claim 1 wherein said mercaptan compound is a polymercaptan having from 3 to 5 mercaptan groups per molecule which is used in an amount of from about 0.00015 to about 0.002 equivalence —SH per mole of monomer in said monomer composition.

15. A method as recited in claim 1 wherein said vinyl halide is vinyl chloride.

16. A method as recited in claim 1 wherein said vinyl halide is vinylidene chloride.

17. A method as recited in claim 1 wherein at least two different vinyl halide compounds falling within said formula are polymerized.

18. A method as recited in claim 17 wherein said two compounds are vinyl chloride and vinylidene chloride.

19. A method as recited in claim 1 wherein said monomer composition contains at least 75% vinyl halide monomer.

20. A method as recited in claim 1 wherein at least two different vinyl halide compounds falling within said formula are polymerized with another non-vinyl halide ethylenically unsaturated monomer.

21. A method as recited in claim 20 wherein said two different vinyl halide compounds are vinyl chloride and vinylidene chloride.

22. A method as recited in claim 1 wherein said monomer composition consists of 100% vinyl halide.

23. A method as recited in claim 22 wherein said vinyl halide is vinyl chloride.

24. A method as recited in claim 1 wherein said vinyl halide is vinyl chloride and said mercaptan compound has from 3 to 5 mercaptan groups per molecule.

25. A method as recited in claim 24 wherein said polymercaptan compound is present in an amount sufficient to provide from about 0.0003 to about 0.002 equivalence —SH per mole of monomer in said monomer composition.

26. A method as recited in claim 1 wherein said polymerization is conducted using suspension polymerization techniques.

27. A method as recited in claim 1 wherein said free-radical initiator is azobisisobutyronitrile.

28. A method as recited in claim 1 wherein said monomer composition contains up to 50% by weight based on the total weight of ethylenically unsaturated monomer of another non-vinyl halide ethylenically unsaturated monomeric material.

29. A method as recited in claim 28 wherein said other non-vinyl halide material is vinyl acetate.

30. A method as recited in claim 28 wherein said other non-vinyl halide material is maleic acid ester.

31. A method as recited in claim 28 wherein said other non-vinyl halide material is fumaric acid ester.

32. A method as recited in claim 28 wherein said other non-vinyl halide material is acrylate ester.

33. A method as recited in claim 28 wherein said other non-vinyl halide material is vinyl alkyl ether.

34. A method as recited in claim 28 wherein said other non-vinyl halide material is acrylonitrile.

35. A method as recited in claim 1 wherein said diene elastomer is present in an amount of from about 0.05% to about 0.5% by weight.

36. A method as recited in claim 1 wherein said diene elastomer is present in an amount of from about 0.1% to about 0.4% by weight.

37. A method as recited in claim 1 wherein said diene elastomer is a fluid at room temperature.

38. A method as recited in claim 1 wherein said diene elastomer has an average apparent molecular weight of from about 200 to about 5,000.

39. A method as recited in claim 1 wherein said diene elastomer is polybutadiene.

40. A method as recited in claim 1 wherein said diene elastomer is a copolymer of styrene/butadiene in a 25/75 weight percent ratio.

41. A method as recited in claim 1 wherein said diene elastomer is polychloroprene.

42. A method as defined in claim 1 wherein said diene elastomer is a copolymer of styrene/butadiene in a 25/75 weight percent ratio having a molecular weight of from about 200 to about 2,000 and which is used in an amount of from about 0.1% to about 0.4% by weight.

43. A method as recited in claim 42 wherein said mercaptan compound is a polymercaptan having from 3 to 5 mercaptan groups per molecule which is used in an amount of from about 0.00015 to about 0.002 equivalence —SH per mole of monomer in said monomer composition.

44. An improved group of vinyl halide polymers which exhibit improved processing characteristics without sacrificing physical properties prepared by the free-radical polymerization of an ethylenically unsaturated monomer composition containing at least 50%, by weight, of a vinyl halide of the formula:

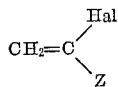

wherein Z is hydrogen or halogen and Hal means halogen, in the presence of: (1) an aliphatic mercaptan compound in an amount based on —SH equivalence of from 0.000075 to 0.05 equivalence —SH per mole of monomer in said monomer composition, and (2) from about 0.01% to about 1% by weight based on the total weight of monomer in said monomer composition of a polymerizable, organosolvent soluble, unsaturated, conjugated diene elastomer.

45. A vinyl halide polymer as recited in claim 44 wherein said monomer composition contains at least 75% vinyl halide monomer.

46. A vinyl halide polymer as recited in claim 44 wherein said monomer composition consists of 100% vinyl halide monomer.

47. A vinyl halide polymer as recited in claim 46 wherein said vinyl halide monomer is vinyl chloride.

48. A vinyl halide polymer as recited in claim 44 wherein said vinyl halide is vinylidene chloride.

49. A vinyl halide polymer as recited in claim 44 wherein said vinyl halide is vinyl chloride.

50. A vinyl halide polymer as recited in claim 44 wherein at least two different vinyl halide compounds falling within said formula are polymerized.

51. A vinyl halide polymer as recited in claim 50 wherein said two different vinyl halide compounds are vinyl chloride and vinylidene chloride.

52. A vinyl halide polymer as recited in claim 44 wherein said monomer composition contains up to 50% by weight based on the total weight of ethylenically unsaturated monomer of another non-vinyl halide ethylenically unsaturated monomeric material.

53. A vinyl halide polymer as recited in claim 52 wherein said other non-vinyl halide material is vinyl acetate.

54. A vinyl halide polymer as recited in claim 52 wherein said other non-vinyl halide material is a maleic acid ester.

55. A vinyl halide polymer as recited in claim 52 wherein said other non-vinyl halide material is a fumaric acid ester.

56. A vinyl halide polymer as reiited in claim 52 wherein said other non-vinyl halide material is an acrylate ester.

57. A vinyl halide polymer as recited in claim 52 wherein said other non-vinyl halide material is a vinyl alkyl ether.

58. A vinyl halide polymer as recited in claim 52 wherein said other non-vinyl halide material is acrylonitrile.

59. A vinyl halide polymer as recited in claim 44 wherein said mercaptan compound is a polymercaptan having at least 3 mercaptan groups per molecule.

60. A vinyl halide polymer as recited in claim 59 wherein said mercaptan compound is a polymercaptan compound having from 3 to 5 mercaptan groups per molecule.

61. A vinyl halide polymer as recited in claim 60 wherein said polymercaptan is pentaerythritol tetra-(3 mercaptopropionate).

62. A vinyl halide polymer as recited in claim 60 wherein said polymercaptan is pentaerythritol tri(3 mercaptopropionate).

63. A vinyl halide polymer as recited in claim 60 wherein said polymercaptan is a mixture of tetra(3 mercaptopropionate) and tri(3- mercaptopropionate).

64. A vinyl halide polymer as recited in claim 60 wherein said polymercaptan is pentaerythritol tetrathioglycolate.

65. A vinyl halide polymer as recited in claim 60 wherein said polymercaptan is trimethylolethane tri(3 mercaptopropionate).

66. A vinyl halide polymer as recited in claim 60 wherein said polymercaptan is trimethylolethane trithioglycolate.

67. A vinyl halide polymer as recited in claim 60 wherein said polymercaptan is trimethylolpropane tri(3 mercaptopropionate).

68. A vinyl halide polymer as recited in claim 60 wherein said polymercaptan is trimethylolpropane trithioglycolate.

69. A vinyl halide polymer as recited in claim 44 wherein said mercaptan compound is used in an amount of from about 0.000075 to about 0.005 equivalence —SH per mole of monomer in said monomer composition.

70. A vinyl halide polymer as recited in claim 44 wherein said mercaptan compound is used in an amount of from about 0.00015 to about 0.002 equivalence —SH per mole of monomer in said monomer composition.

71. A vinyl halide polymer as recited in claim 44 wherein said free radical polymerization is conducted using suspension polymerization techniques.

72. A vinyl halide polymer as recited in claim 44 wherein said diene elastomer is persent in an amount of from about 0.05% to about 0.5% by weight.

73. A vinyl halide polymer as recited in claim 44 wherein said diene elastomer is present in an amount of from about 0.1% to about 0.4% by weight.

74. A vinyl halide polymer as recited in claim 44 wherein said diene elastomer is a fluid at room temperature.

75. A vinyl halide polymer as recited in claim 44 wherein said diene elastomer has an average apparent molecular weight of from about 200 to about 5,000.

76. A vinyl halide polymer as recited in claim 44 wherein said diene elastomer is polybutadiene.

77. A vinyl halide polymer as recited in claim 44 wherein said diene elastomer is a copolymer of styrene/butadiene in a 25/75 weight percent ratio.

78. A vinyl halide polymer as recited in claim 44 wherein said diene elastomer is a copolymer of styrene/butadiene in a 25/75 weight percent ratio having a molecular weight of from about 200 to about 2,000 and which is used in an amount of from about 0.1% to about 0.4% by weight.

79. A vinyl halide polymer as recited in claim 78 wherein said mercaptan compound is a polymercaptan having from 3 to 5 marcaptan groups per molecule which is used in an amount of from about 0.00015 to about 0.002 equivalence —SH per mole of monomer in said monomer composition.

References Cited
UNITED STATES PATENTS

| | | | |
|---|---|---|---|
| 3,119,786 | 1/1964 | Christen et al. | 260—45.5 |
| 3,240,843 | 5/1966 | Nelson | 260—879 |
| 3,257,340 | 6/1966 | Osmond et al. | 260—4 |
| 3,257,341 | 6/1966 | Osmond et al. | 260—4 |
| 3,327,022 | 6/1967 | Riou et al. | 260—879 |
| 3,330,886 | 7/1967 | Riou et al. | 260—879 |

JOSEPH L. SCHOFER, Primary Examiner

R. A. GAITHER, Assistant Examiner

PO-1050
(5/69)

UNITED STATES PATENT OFFICE
CERTIFICATE OF CORRECTION

Patent No. 3,562,359  Dated  February 9, 1971

Inventor(s) Sheldon F. Gelman

It is certified that error appears in the above-identified patent and that said Letters Patent are hereby corrected as shown below:

Column 1, line 44, the word "ealstomer" should read --elastomer--.
Column 2, line 35, "from 0.000075" should read --from about 0.000075-- ; line 52, "procesing" should read --processing--.
Column 4, line 47, "atoms" should read --atom-- ; Col. 4 in the formula, the integer "n" has been omitted.
Column 5, semicolons omitted at the end of the three lines of formulae; line 43 (top line of formula) "group" should read --groups--.
Column 6, line 16 the word "propionate," should read --propionate), line 23, "trip(p - mercapto-" should read --tri(p-mercapt
Column 11, 12, Table II, Example 2 under col. "Butadiene Elastomer Parts" should read --0.1--.
Column 14, line 47, delete the word "used" after 8/1/1; line 56, the word "dodecy" should read --dodecyl--; line 61, "0.054" should read --0.045-- .
Column 15, line 47, comma after "Example 1" should be period.
Column 16, line 35 "mutadiene" should read --butadiene-- ; line 74, "t-butyl" should read --dodecyl-- .
Column 20, Claim 56, the word "reiited" should read --recited-- .
Column 22, line 2, "marcaptan" should read --mercaptan-- .

Signed and sealed this 13th day of July 1971.

(SEAL)
Attest:

EDWARD M. FLETCHER, JR.        WILLIAM E. SCHUYLER, JR.
Attesting Officer               Commissioner of Patents